United States Patent [19]

Willets

[11] 4,013,016
[45] Mar. 22, 1977

[54] RAILROAD CAR TRUCK SUSPENSION SYSTEM

[76] Inventor: Elwood H. Willets, 102 S. Penataquit Ave., Bay Shore, N.Y. 11706

[22] Filed: June 12, 1975

[21] Appl. No.: 586,244

[52] U.S. Cl. .......................... 105/199 R; 308/138; 280/687

[51] Int. Cl.² ........................................ B61F 3/00

[58] Field of Search .............. 308/138; 105/199 R, 105/197 R, 224.1, 182 R, 190 A, 189; 280/104.5 R, 687

[56] References Cited

UNITED STATES PATENTS

| | | | |
|---|---|---|---|
| 3,323,470 | 6/1967 | Williams | 308/138 |
| 3,329,098 | 7/1967 | Williams | 308/138 |
| 3,329,099 | 7/1967 | Inhorning | 105/197 R |
| 3,354,837 | 11/1967 | Williams | 308/138 |
| 3,358,615 | 12/1967 | Williams | 308/138 |
| 3,777,672 | 12/1973 | Schneider | 105/224.1 |
| 3,818,841 | 6/1974 | Julien | 105/199 R |

Primary Examiner—Philip Goodman
Assistant Examiner—John A. Carroll
Attorney, Agent, or Firm—Paul J. Sutton

[57] ABSTRACT

The present invention includes a suspension system for use with railroad freight car trucks, or the like, wherein vertical, transverse and longitudinal movements of the car body sprung mass are restrained and isolated from rail-induced excitations and dampened by captive elastomeric means. This system employs crossed levers to restrain said sprung mass parallel with respect to the supporting railroad track.

3 Claims, 8 Drawing Figures

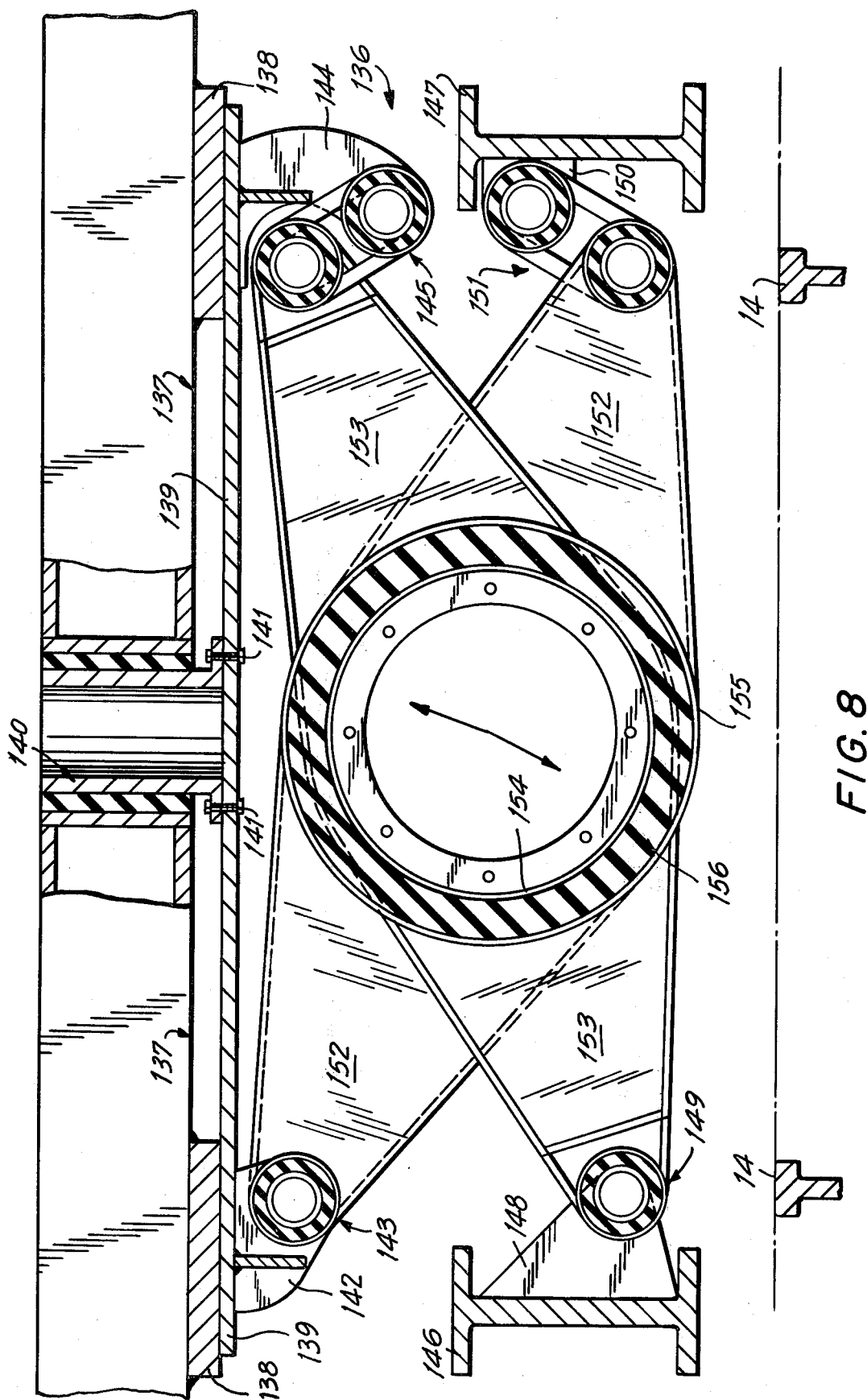

RAILROAD CAR TRUCK SUSPENSION SYSTEM

This application is related to the structure of my co-pending applications Ser. Nos. 356,496, filed May 2, 1973 and 293,648, filed Sept. 29, 1972, both of which are continuation-in-part applications of my application Ser. No. 123,581, filed Mar. 12, 1971, now U.S. Pat. No. 3,687,478 granted Aug. 29, 1972. Pat. No. 3,687,478 further discloses improvements over the subject matter contained in my U.S. Pat. No. 3,572,745 dated Mar. 30, 1971. U.S. Pat. No. 3,572,745, itself, is a continuation-in-part of application Ser. No. 721,558, filed Apr. 1, 1968, now abandoned, and application Ser. No. 649,502, filed June 28, 1967, now abandoned. The subject matter of my aforementioned applications and my U.S. Pat. Nos. 3,572,745 and 3,687,478 is hereby incorporated by reference into the present specification.

This invention relates generally to vehicle suspension systems and more particularly to a vehicle suspension system for use with a railroad car truck or the like for isolating vertical, transverse and longitudinal forces that are normally encountered during operation from the unsprung mass.

I have made many inventions which have solved the problems associated with isolating road-induced excitations from the sprung mass of various types of vehicles. The aforementioned list of patent applications and patents represent but a few of my efforts to protect inventions which overcome prior art problems associated with the isolation of forces and vibrations as between the driver or vehicle cargo, on one hand, and operationally induced vibrations, on the other hand. My efforts have been successful, as can be attested to in any number of tests conducted by me.

My more recent efforts to provide superior and economical suspension systems have included the provision of vehicle suspension systems utilizing one or more elastomeric members capable of exhibiting a progressively increasing spring rate under increasing loads. In the case of truck and trailer suspensions, for example, road-induced excitations are isolated as between neighboring axles as well as between these axles and the vehicle sprung mass. Unlike many known or prior art suspensions which, because of their structure, transmit these excitations to the vehicle sprung mass and to the vehicle driver himself, my suspension systems have been able to overcome this rather serious drawback which represents not only a health hazard to the vehicle driver, but rather great economic losses each year to the owners of damaged cargo. Suffice it to say that the vehicle industry is constantly on the alert and receptive to suspension structures capable of overcoming these problems.

Before proceeding further with a discussion of the present invention, it will be useful here to repeat and devote some words to the question of "vibrations" of the type normally exhibited in vehicles and their associated suspension structures. The occurrence of vibrations is obviously quite widespread. While many uses of vibrations harness this energy to cause favorable or helpful uses, such as using vibrations to relieve internal cooling stresses in castings and to study the process of aging, there are a large number of rather bad effects caused by vibrations. The phenomenon of resonance or near-resonant conditions create high stresses and very often hasten the time when eventual structural failure may occur. Moreover, vibration has a bad psychological effect on people in the vicinity in that it is tiring, slows production and creates a generally undesirable condition. In the case of railroad cars wherein passengers are susceptible to being severely rocked back and forth, or freight cars, wherein cargo may be damaged, this problem is of great concern.

Basically speaking, vibrations occur in elastic systems that consist of one or more masses connected to each other or to a fixed member by springs. The phenomenon of vibration is the motion of a body or system that is repeated after a given interval of time known as the "period." The number of cycles of motion per unit of time is called the "frequency." The maximum displacement of the body or some part of the system from the equilibrium position is commonly referred to as the "amplitude" of the vibration at that point.

There are two general types of vibration, namely: rectilinear and torsional. Rectilinear vibrations appear in two basic forms: the longitudinal form is the axial compression and extension of bars and wires and includes the compression and extension of springs of the coiled type, for example; the transverse rectilinear vibration is seen in the motion of beams perpendicular to their centerline. The motion of torsional vibrations is one of oscillation or twisting, as in the case of shafts, and their amplitude is measured in radians or degrees, as opposed to inches in the case of rectilinear vibrations.

When a body or system is given an initial displacement from the equilibrium position and released, it will vibrate with a definite frequency known as its "natural frequency". This vibration is said to be "free" since no external forces act upon it after the initial displacement. The body vibrates with decreasing amplitude until it comes to rest. This reduction in amplitude is caused by a loss of the total energy in the system, known as "damping" and may be due to friction or resistance, etc. In some cases where the amount of damping is very large, the body will not vibrate but may merely creep back to the equilibrium position and its motion is said to be "aperiodic".

In conditions of the type normally associated with vehicles and vehicle suspension systems, an unbalanced vibrational system is created where the body or system is subjected to periodic external forces of the type normally associated with operational excitations induced by road or rail conditions. In such cases a "forced vibration" occurs and if the frequency of this external force is the same as the natural frequency associated with the mass involved, resonance takes place. The body or system then vibrates with large amplitudes, which result in high stresses and possible interference of parts. Problems associated with resonant vibrational conditions are greatly increased in cases where transient or temporary vibrations are superimposed upon steady-state vibrations, since the resultant motion is the vector sum of the two motions considered independently.

The foregoing discourse concerning vibrations is meant only to once again familiarize the reader with the terminology normally used in connection with vibrational problems and to render an outline of the elements making up resonance, which is an undesirable phenomenon sought to be overcome by this and many of my previous inventions. Reference is made here to my U.S. Pat. No. 3,290,053, which is not anticipatory of the subject matter of my present invention. The present invention concerns itself with a vehicle suspension system which will be described for use with railroad car trucks. However, I wish to emphasize here that the present invention may be equally well suited for many other applications involving vehicles other than railroad cars. The use of a railroad car truck as an example in describing this invention should in no way limit in the mind of the reader this vehicle suspension system, since it is equally well suited in concept and structure for use with other types of vehicles, including vehicles equipped with a single axle suspension system.

A primary object of this invention is to provide a suspension system which resiliently isolates the sprung mass of a rail car, comprising its body and load, from the operatively developed excitations of rail train movement.

Another object of this invention is to resiliently restrain the sprung mass of a rail car in train operation, parallel to track, both transversely and vertically.

Another object is to provide a low friction, lubrication free, suspension system interposed between the car truck and car body of a rail car, in which the system exhibits characteristics wherein the hysteresis of several bonded elastomers resiliently dampen excitations operationally induced at (1) switch points; (2) uneven rail or roadbed; (3) worn rails or wheels; and (4) adverse winds.

Yet another object is to provide a new concept of rail car suspension for safety and comfort of passenger and cargo which is silent, of durable construction, economical of first cost and operation, and efficient at train speeds more competitive of and comparable with air transport.

Still another object is to provide a means of supporting the sprung mass of a rail car directly at body side frame bearings, with means of pivotally centering each supporting car truck inboard of car ends, to reduce operational impacts at switch points, without affecting distribution of the sprung mass on the car truck.

A further object is to prevent worn wheel flanges and rails, by damping transverse impulses.

Another object of the present invention is to provide a vehicle suspension system capable of reducing and eliminating undesirable results associated with vertical, transverse and longitudinal dynamic impacts, static transverse roll, and resonance (and metallic noise) resulting from lost motion.

Yet a further object of this invention is to provide a vehicle suspension system which will weigh less than conventional suspension systems, will reduce cargo damage in transit, will reduce wheel and rail wear, will reduce or eliminate resonance and their associated derailments, and which will reduce noise.

Yet another object of the present invention is to provide a vehicle suspension system which will provide to the user improved operational characteristics, including, without limitation, the isolation of vertical, transverse and horizontal impacts of rail joints, switch points, curves and brake forces from the truck frame.

Another object of this invention is to fulfill all of the aforementioned objects and overcome the limitations and disadvantages of prior art suspension structures and systems. According to one aspect of the concept of the present invention, the novel means or steps which are employed to overcome the disadvantages of the prior art include a vehicle suspension system for use with a railroad freight car equipped with car trucks having at least one axle, and comprising a journal box disposed at each transverse end of the axle. Left and right longitudinally extending vehicle side frame members are disposed at each transverse side of the freight car. The suspension system, according to the present invention, includes a crossed lever assembly, including two crossed levers, one of which is secured to an internal hub, while the opposing lever is integral with an encircling hub, which is disposed concentrically about the first hub referred to. Adjacent faces of these hubs are, respectively, bonded to an elastomeric collar, which is operatively torsionally stressed in torisonal sheer and is also compressively stressed for vertical support of the sprung mass of the railroad car involved.

Upwardly extending ends of these crossed levers are attached to the sprung mass, which is generally supported thereby, with provision for arcuate travel of at least one of these crossed lever ends. The downwardly extending ends of these crossed levers are supported by truck side frames, with a pivotal connection thereof at one side frame and a shackle-type connection at a transversely opposite side frame. As described, this suspension may be considered a substitute for the cross bolster of a conventional three-piece car truck, except that the centerplate is dispensed with, as the load is taken directly from the car body side sills on the upwardly extending crossed lever ends.

The car truck suspension, according to this invention, is disposed in pivotal supporting relationship with respect to the car body, at the axis of these said crossed levers, either mid-length of the truck wheel base (as usual) or inboard, toward the center of the car length. This will help to reduce impact at switch points. A ball and socket connection at the lower end of a wishbone structure hinged to body side sills, accommodates vertical deflections of the suspension while preserving pivotal centering of the car truck. Vertical movement at this axial center of the crossed levers is approximately one-half of the deflection of the sprung mass. The ball end of the aforementioned ball-socket assembly is detachably secured to a flange which, in turn, is bolted to an outboard end of the inner concentric hub by the very same bolts which secure one-half of the bifurcated lever thereto.

My invention will be more clearly understood from the following description of specific embodiments of the invention, together with the accompanying drawings, wherein similar reference characters denote similar elements throughout the several views, and in which:

FIG. 8 is a fragmentary sectional, elevational view of still a further embodiment of the present invention, which utilizes a different hinge-shackle, crossed lever structural combination.

Figure 1:
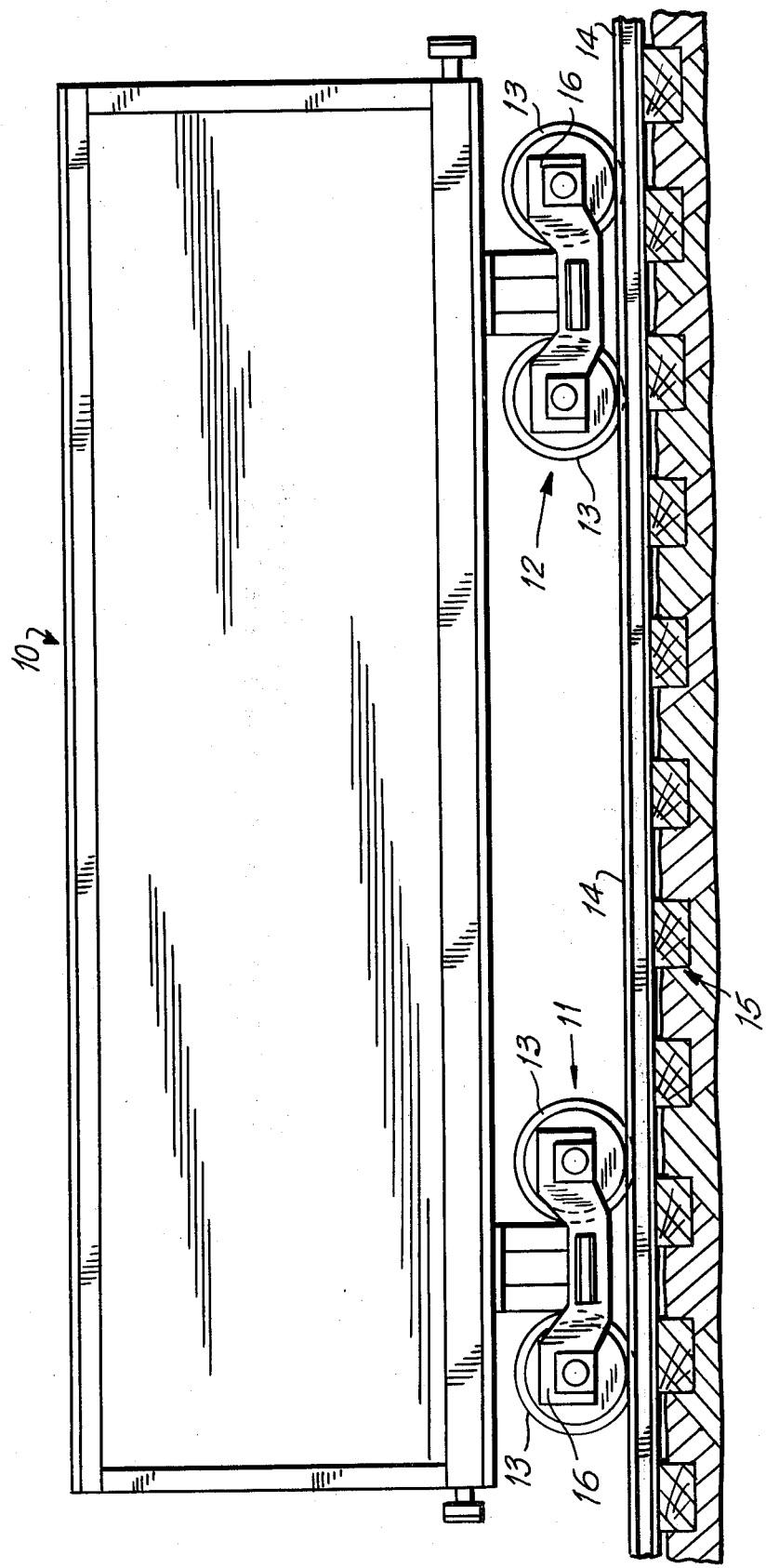
FIG. 1 is a partial fragmentary sectional, elevational view, depicting a railroad freight car equipped with the suspension structures, according to the present invention.

Referring now in more detail to the drawings, FIG. 1 illustrates a railroad freight car 10 of a conventional type and design, normally used to transfer cargo, and which is equipped with car truck assemblies 11 and 12. Throughout the specification and claims appended hereto, the term "car body" will also be used to denote what has already been described as freight car 10. Each of car truck assemblies 11 and 12 includes a plurality of wheels 13 of a conventional type, usually 33 or 36 inches in diameter, which are adapted to ride upon rails 14 of track 15. A truck side frame 16 forms part of each of truck or truck assemblies 11 and 12.

Figure 2:
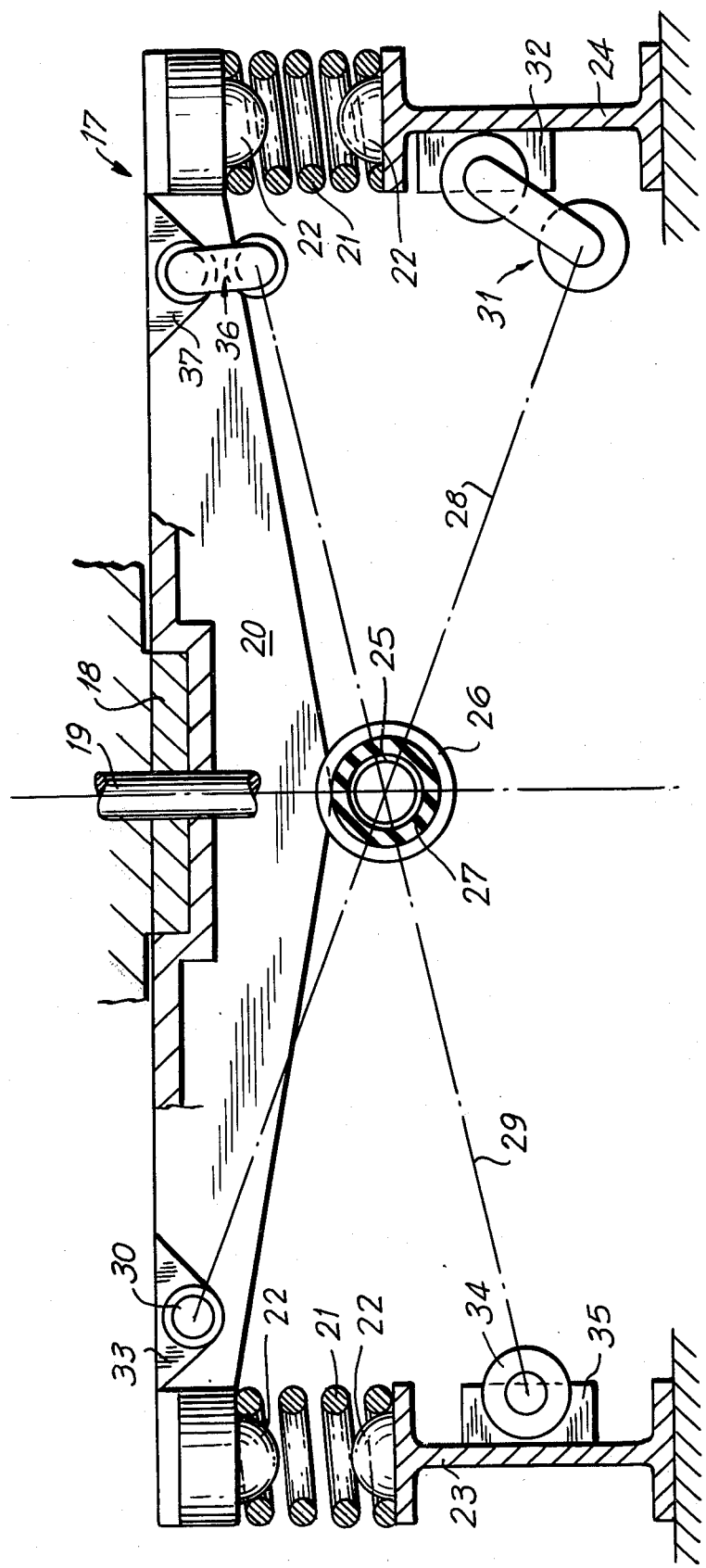
FIG. 2 is a partial fragmentary sectional, elevational view, showing schematically the inter-relationship between the crossed lever members, associated with my present invention.

FIG. 2 represents both a realistic and schematic representation of a truck suspension system 17, wherein a car body centerplate 18 and kingpin trunnion assembly 19 are pivotally secured to suspension system 17. Conventionally, a 6 inch kingpin assembly is normally used in a pivotal connection to a car center sill, and, in the case of that shown in FIG. 2, kingpin assembly 19 is disposed inboard of a car truck bolster member 20.

As shown in FIG. 2, a three piece car truck suspension system 17, includes a cluster of vertical support springs 21 of the helical type, which underly side bearings at transversely opposite ends of a car truck bolster 20. This location of helical springs 21 enables the sprung mass of car body 10 to roll and shift transversely, in the absence of restraining forces. Helical springs 21 are located about, and between, pilot members 22, which preserve alignment of these springs atop side frame members 23 and 24, which, in turn, are tied together at journal boxes (not shown in FIG. 2). The cross-sectional shape or configuration of side members 23 and 24 may be of an I-beam configuration, as shown, or other suitable shapes, without departing from the scope and spirit of this invention.

Located substantially midway between the axes of helical springs 21 is an assembly, which includes an inner hub 25 and an outer hub 26, which hubs are interconnected and bonded at their radially adjacent surfaces to an elastomeric collar or member 27. Center line 28 represents the center line of a lever member, which is secured at its mid-point to inner hubs 25, while center line 29 represents the center line of another lever member, which is secured at its mid-point to outer hub 26. For the sake of clarity, in FIG. 2, these lever members are not shown, but as easily seen from the configuration of their center lines, represent crossed levers, which are hingedly attached to one another by means of a common axis of oscillation at elastomeric collar 27.

In the case of the lever member, whose center line is shown at 28, its upwardly extending end is pivotally joined at a hinge assembly 30, while its lower end is pivotally joined to a shackle assembly 31, which, in turn, is supported by a plate member 32, secured to side frame member 24. A plate member 33 provides the means of support for hinge assembly 30.

In the case of the lever member, whose center line 29 is shown in FIG. 2, this lever member is connected at its lower end to side frame member 23 by means of a hinge assembly 34, secured to side frame member 23 by means of a mounting plate 35, while at its upper extending end, it is connected to a shackle assembly 36, in turn, secured to a mounting plate 27 with pivotal movement therebetween.

Throughout the specification, the terms "hinge assembly" and "shackle assembly" will be used to describe the configurations shown in the various FIGS. The important distinction between the hinge assembly and the shackle assembly, associated with each crossed lever member is the fact that the hinge assembly provides for pure pivotal movement only, while the shackle assembly provides a linkage-type movement by means of an arm interconnecting to hinged connections. The provision of a pair of crossed levers, hingedly attached to each other at their common axis of oscillation, with their upwardly extending ends secured to the car body, and their downwardly extending ends attached to car truck side frames 23 and 24, with shackles at one transverse side and hinge connections opposite thereof, provides a unification of deflection of the independent spring clusters to prevent transverse roll, by providing parallelism of vertical movement as between the sprung and unsprung masses of suspension system 17. The addition of a predetermined friction in this system is contemplated to dampen periodic cycling of vertical impulses, as will become more apparent after reading further in this specification.

Figure 3:
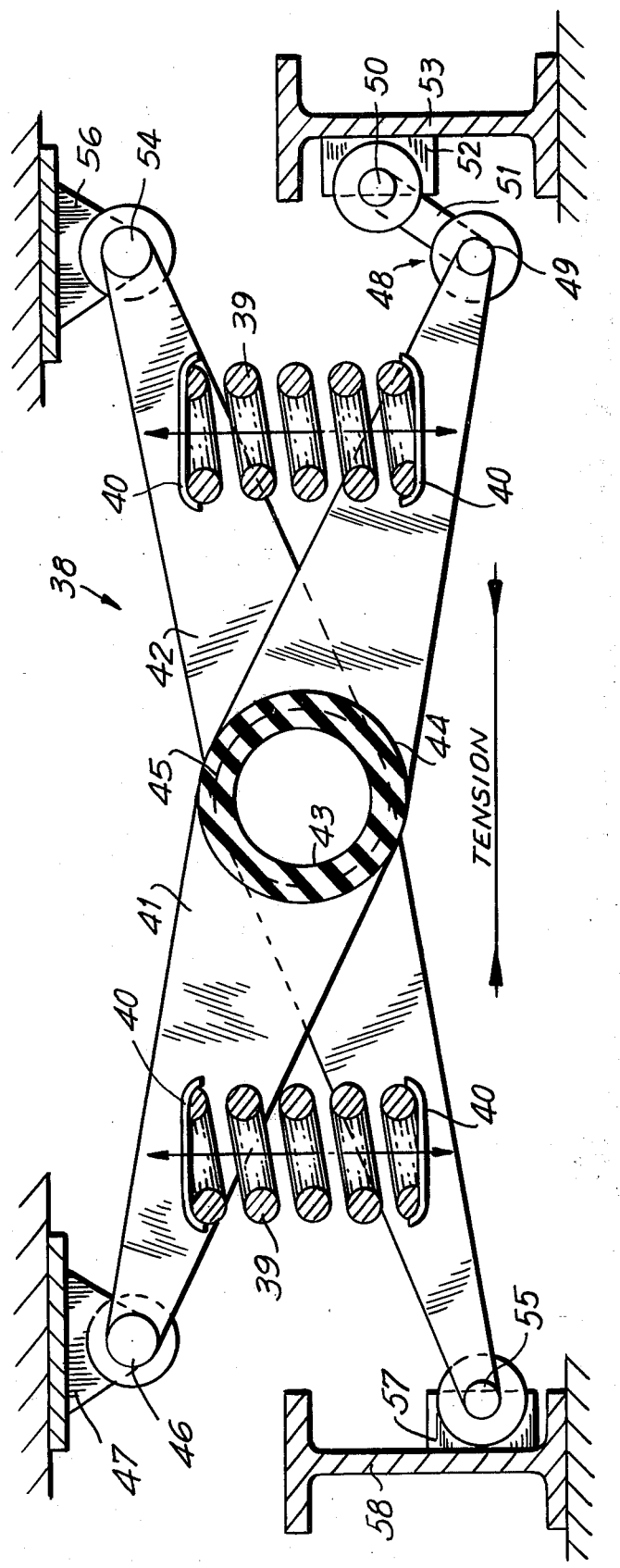
FIG. 3 is a partial fragmentary sectional, elevational view, similar to FIG. 2, depicting an alternate embodiment of my invention, utilizing helical springs in combination with the crossed levers thereof.

FIG. 3 represents another embodiment of the present invention, wherein, unlike FIG. 2, the crossed lever arrangement is shown in full line, as opposed to center line representation. In FIG. 3, a suspension system 38, provides optional means of resistance to load deflection, by providing a crossed lever assembly, usable with a centerplate capable of taking the car body load. In this arrangement, the load is taken directly on side bearings which tend to eliminate lost motion as one source of transverse roll. Helical compression springs 39 are vertically disposed between respective upper and lower spring seats 40.

Spring seats 40, associated with helical compression springs 39, are secured by conventional means, to crossed lever members 41 and 42, respectively. Crossed lever member 42 is secured to an inner hub 43, while lever member 41 is secured to an outer hub 44. Inner and outer hubs 43 and 44 are interconnected about a common pivotal axis by an elastomeric collar 45, which is bonded to the inner face of outer hub 44 and the outer face of inner hub 43.

At its upper extending end, lever member 41 is pivotally connected to a hinge assembly 46, which, in turn, is interconnected with the car body by means of a counting bracket 47. At its lowest rightmost end, lever member 41 is interconnected to a shackle assembly 48 composed of hinges 49 and 50, interconnected by arm 51, and mounted by means of a bracket 52 to side frame member 53. Lever member 42 extends between hinge assembly 54, at its rightmost upper end, and hinge assembly 55, at its leftmost lower end. Hinge assembly 54 is connected to the car body, by means of bracket 56, while hinge assembly 55 is connected by means of bracket 57 to side frame member 58.

Figure 4:
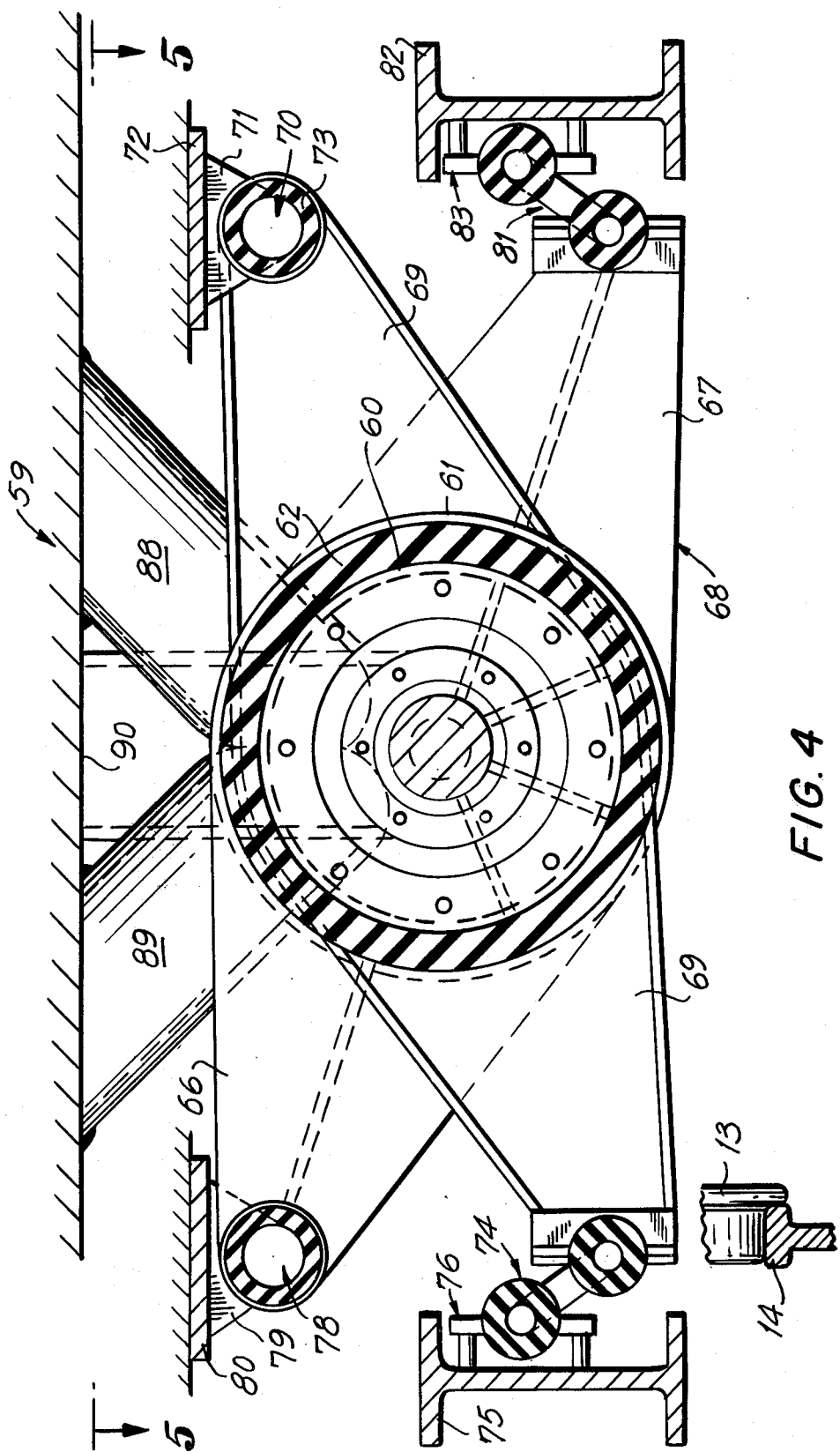
FIG. 4 is a fragmentary sectional, elevational view of an alternate embodiment of the present invention, utilizing a hinge-shackle structure combination.
Figure 5:
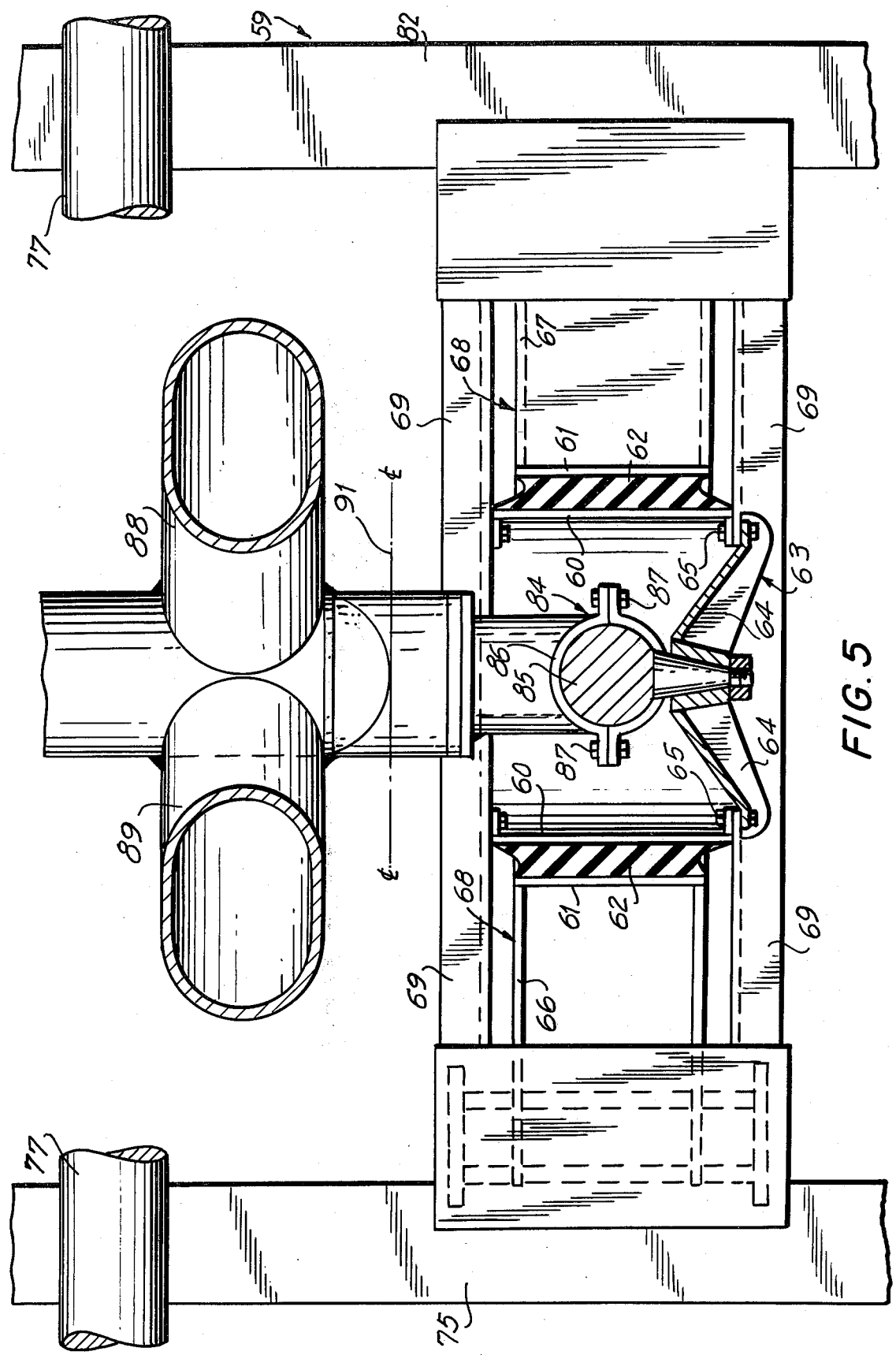
FIG. 5 is a sectional plan view of the embodiment of the invention shown in FIG. 4.

FIGS. 4 and 5 disclose a crossed lever assembly arrangement of a suspension system which utilizes a pivotally centered ball and socket connection at the axes of cross levers, with a hinge in the anchorage to car body sills, thereby enabling vertical movement as between the body and the truck as load supporting spring means are deflected. Deceleration forces of car truck brakes are transmitted to the car body through this ball and socket arrangement. The car body overcomes the inertia and rolling resistance of the car truck as the train is started and operates, by means of this same ball and socket arrangement, in lieu of a conventional kingpin and centerplate-type of structural configuration.

More specifically, a suspension system 59 is shown in FIGS. 4 and 5. An internal hub 60 is spaced from an outer hub 61. As elastomeric collar 62 interconnects hubs 60 and 61, and is bonded to the outer surfaces of inner hub 60 and the inner surfaces of outer hub 61. A bifurcated lever 69 is interconnected to internal hub 60 by means of an internal flange which is flush with the axial ends of the inner hub. A ribbed bolted plate member 63 includes a plurality of ribs 64 for purposes of strength, and is bolted at 65 to and intregal with inner hub 60.

The outer hub 61, which is bonded to elastomeric collar 62, is interconnected to arms 66 and 67 of lever member 68. Lever member 68 extends in cross-relationship with respect to lever member 69. Thus, lever members 68 and 69 are crossed lever members, making up an assembly. Lever member 69, which is bifurcated, extends at its uppermost or upwardly extending end, to a hinge assembly 70. Hinge assembly 70 is secured by means of a bracket 71 to a truck side bearing 72. As in the case of all hinge members and, for that matter, bracket assemblies referred to, throughout this specification, hinge assembly 70 includes an elastomeric collar 73, which resists the loads applied through this hinged connection.

At its lower or downwardly extending ends, lever member 69 extends from inner hub 60 toward a shackle assembly 74, which is supported by truck side frame 75, by means of a bracket assembly 76. An axle 77 of the railroad freight car, and its associated truck assembly, is fragmentally shown in FIG. 5.

Looking now at lever member 68, which is made up of its radially extending arms 66 and 67, upwardly extending arm 66 extends from outer hub 61 toward, and into, pivotal connection with a hinge assembly 78, of the type already described for hinge assembly 70. Hinge assembly 78 is secured by means of a bracket 79 to truck side bearing 80. At its downwardly extending end, arm 67 extends toward, and into, engagement with shackle assembly 81, which, in turn, is interconnected with side frame member 82, by means of a bracket assembly 83.

Unlike the embodiment of the present invention, already described for FIG. 2, wherein a kingpin assembly is utilized, a ball and socket assembly 84 is utilized in the embodiment of this invention disclosed in FIGS. 4 and 5, and is disposed internally of internal or inner hub 60. A steel ball 85 is captively restrained within a socket, formed by surrounding hub 86 which is flanged and held together by bolts 87. As best seen in FIG. 4, a "wishbone" structure including upwardly extending tubular members 88 and 89 extend to and in welded integral connection with cross sill 90. A center line 91 depicts the center line of a hinge which interconnects this wishbone structure comprising tubular members 88 and 89 and the crossed lever hub assembly already described in detail. The hinge shown with its center line 91 is disposed in the anchorage to the car body sill 90, enabling vertical movement as between the body and the truck as the load-supporting spring means is deflected, while also restraining the car truck so as to pivot as the track varies from straight-away.

Figure 6:
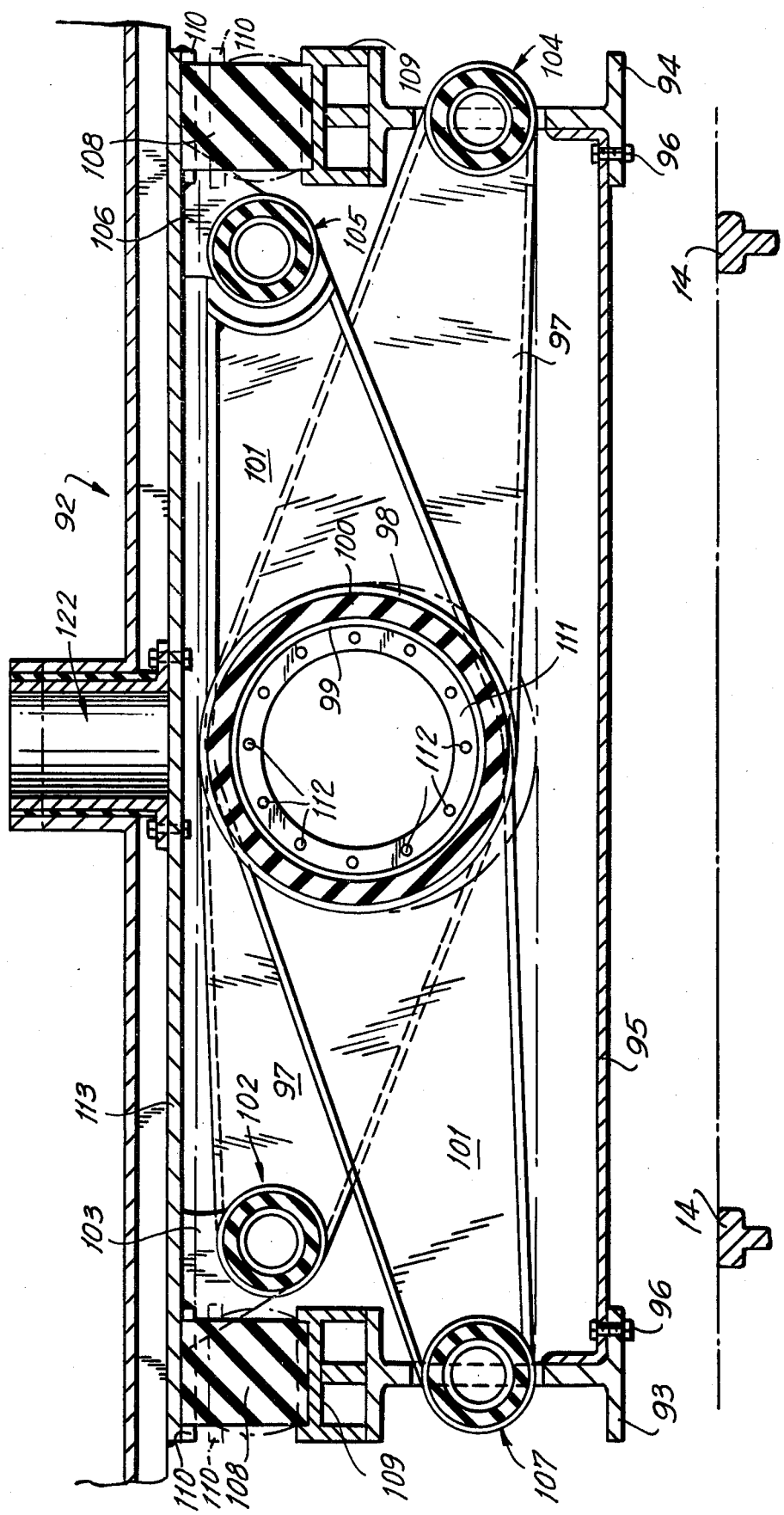
FIG. 6 is a fragmentary sectional elevational view of an alternate embodiment of my present invention wherein radial deflection of the load bearing bushings absorb the arcuate movement without use of shackles.
Figure 7:
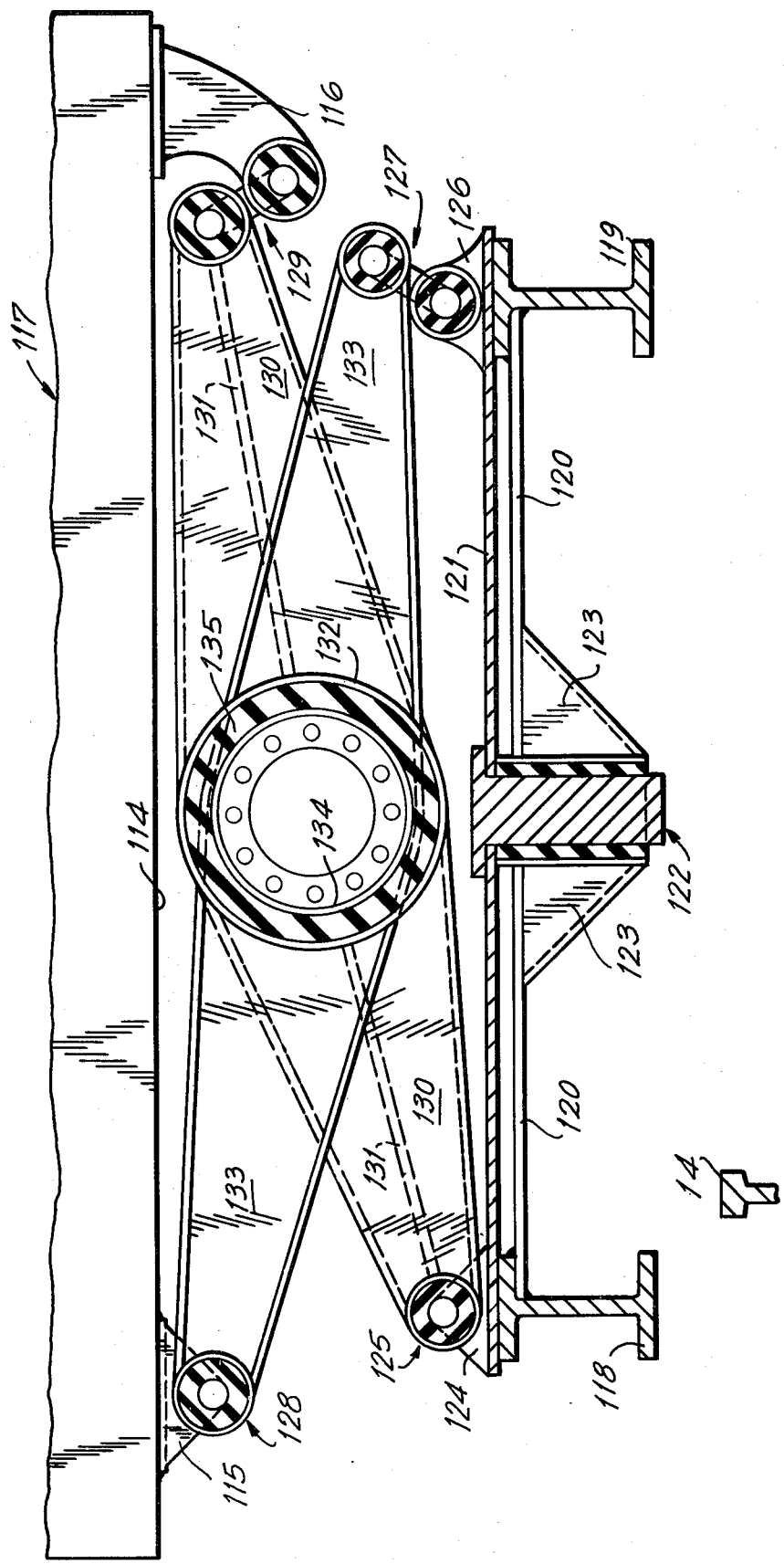
FIG. 7 is a fragmentary sectional, elevational view of yet another embodiment of the present invention which utilizes a hinge-shackle structural combination.

Referring now to FIGS. 6, 7, and 8, it is desired with these drawings to show yet further alternate means by which a crossed lever central hub arrangement may be utilized without departing from the scope or spirit of this invention.

Referring now to FIG. 6 in more detail, a suspension system 92 is shown including side frame members 93 and 94. The base flanges of side frame members 93 and 94 are shown as being tied together by means of a tie plate 95, which serves a number of advantageous purposes. Tie plate 95 is secured such as by bolts 96 to the side frame member flanges in order to eliminate and prevent biasing of the side frames, as between the side frames and the axles. This will tend to eliminate, what would otherwise be a condition which would permit wearing of the wheels in contact with rails 14. This anti-biasing tie plate concept is novel with the present invention.

A pair of crossed levers is shown in FIG. 6, one of which is pressed lever and another is a bolted lever. Outer crossed lever member 97 is secured to an outer hub 98 by welding or other conventional means. An inner hub 99 is spaced from outer hub 98, and each of these hubs are bonded to an elastomeric collar 100 therebetween. A crossed lever member 101, whose axis crosses the axis of lever member 97, and hence the name, is secured, such as by bolting to inner hub 99. Lever member 97 is connected at its upwardly extending end to a hinge assembly 102, which is secured by means of a bracket assembly 103 to the car body. At its lower downwardly extending ends, lever member 97 is connected to a hinge assembly 104, which is clamped by means of conventional clamp means to side frame member 94.

Looking now at lever member 101, its upper and upwardly extending end is interconnected with a hinge assembly 105, which, in turn, is secured to the car body by means of a bracket assembly 106. The lever member 101 is interconnected with hinge assembly 107 at its downwardly extending lower end, which in turn, is clamped to side frame member 93.

Of interest in the suspension system 92, shown in FIG. 6, is the presence of opposite pairs of elastomeric cylinders 108, totalling four in number, which stand vertically, and are capable of being compressed to the configuration shown in phantom outline immediately about the full line representation of each. Elastomeric cylinders 108 are seated upon respective supporting frame assemblies 109, which are secured to the uppermost portions of side frame members 93 and 94. The lowermost portions of elastomeric cylinders 108 sit within a hollow opening formed to accommodate the shape of elastomers 108, while their upper ends are restrained by means of plate members 110, which are formed with openings to accommodate the entry of the upper ends of elastomeric cylinders 108. A kingpin assembly 122, centrally disposed above the crossed lever construction, already described, is best seen in FIG. 6. A cover plate 111 is secured by means of a plurality of bolts 112 to the inner hub structure, already described.

In operation, suspension 92, as shown in FIG. 6, enables the vertically disposed cylindrical elastomeric compression resistant members 108, which are interposed between the side frame members 93 and 94 and the truck bolster plate 113, to accommodate operational loads upon these vertical springs uniformly, thereby exhibiting the favorable characteristics enjoyed by this invention.

FIG. 7 represents yet another departure from the previous embodiments described and represents another structural method of accomplishing the favorable results achieved with the present invention. The bottom of the railroad car body crossed sill 114 is supported by means of brackets 115 and 116, upon a supsension system 117. Brackets 115 and 116 are body brackets, which are secured by means of welding, or other conventional means, to the bottom of the car body, at a portion commonly referred to as the body cross sill. Side frame members 118 and 119 are interconnected by means of a plate truck bolster, which is secured, such as by welding, to the upper flanges of side frame members 118 and 119. This truck plate bolster 120 extends longitudinally with respect to the wheel base, to prevent biasing of the side frames, with respect to the axles, yet permitting torsional flexibility, so as to accommodate articulation vertically between diagonal wheels of the subject truck. The upper surfaces of side frame members 118 and 119 provide body side bearings, upon which a body bolster 121 rests. A kingpin assembly 122 extends through body bolster 121 and the plate truck bolster 120 in a sleeved arrangement, reinforced by means of gusset plates 123. A bracket 124, situated atop body bolster 121, interconnects a hinge assembly 125 with the body bolster. A bracket assembly 126 interconnects shackle assembly 127 with body bolster 121.

Bracket 115, already described, interconnects hinge assembly 128 with body cross sill 114, while bracket 116 interconnects a shackle assembly 129 with this same cross sill.

As already described, for previous embodiments of my invention, a lever member 130, reinforced by a web 131, extends between hinge assembly 125 and shackle assembly 129, and is integrally connected to an outer hub 132. A lever member 133 extends between hinge assembly 128 and shackle assembly 127, and is integrally connected to an inner hub 134. Inner hub 134 and outer hub 132 are bonded and interconnected by means of an elastomeric collar 135, as previously described.

FIG. 8 discloses yet a further embodiment of my invention, utilizing yet another structural arrangement of crossed levers. A suspension system 136 shown in FIG. 8, in which a body bolster 137 is situated upon body side bearings 138, which, in turn, are supported atop a bolster plate 139. A kingpin bracket assembly 140 is secured by bolts 141 to truck bolster plate 139. A bracket assembly 142 interconnects a hinge assembly 143 with truck bolster plate 139, while a bracket assembly 144 interconnects a shackle assembly 145 with this same truck bolster plate.

Side frame members 146 and 147 are shown, spaced from one another in FIG. 8. A strut or bracket 148 interconnects a hinge assembly 149 with side frame member 146, while a bracket 150 interconnects a shackle assembly 151 with side frame member 147. A lever member 152 extends downwardly from hinge assembly 143 to an interconnection with shackle assembly 151, while a lever member 153 extends downwardly from shackle assembly 145 to an interconnection with hinge assembly 149. As has already been described previously, for other embodiments of this invention, lever member 153 is interconnected with, and is integral with, inner hub 154, while lever member 152 is integral, and is connected to, outer hub 155. An elastomeric collar 156 is bonded, and interconnects, inner and outer hubs 154 and 155. Thus, cross levers, lever members 152 and 153, make up a suspension system 136, having the advantages and benefits, previously described.

Now that the specific structural arrangements within FIGS. 1 – 8 have been described, a number of observations deserve mentioning here in the specification. It is important to realize that the unsprung mass of a 100-ton capacity rail car will, in all likelihood, not exceed 8 – 10 percent of the weight of the sprung mass. This unsprung mass represents the primary or, in some cases, the sole stabilizing influence on transverse roll of the sprung mass, especially where track rails are inadequately banked to offset the centrifugal forces acting upon the structure at curves. In the absence of operational parallelism between the track rails and the sprung mass, differentials in transverse deflections of independent load deflective springs, enable one spring to deflect under the increased static load on the outside of a curve, while the opposite spring is resultantly unloaded. Since it is well known that once such a transfer of load occurs, in the absence of friction in the suspension, recycling may occur indefinitely, with the disadvantageous results already mentioned above. In the rail car suspension system provided by the present invention, it is an object to utilize the inherent torsional stability or resistance of the sprung mass, namely the rail car body, to equalize the transverse forces on each truck suspension, by locating the car truck suspension, provided by my invention, at a first end of a car with shackles of the suspension system on one side thereof, and locating the second truck of the car with its shackles to the opposite side of the car, thereby utilizing the torsional resistance of the car body to eliminate, or nullify the tendency of the torsional resistance shackles of each pair of crossed levers to reflect in resistance to transverse forces operationally induced. This feature of my invention deserves the special attention of the reader.

Where the suspension system, according to my invention, is utilized as an integral part of the car body, the upwardly extending ends of the pair of crossed levers, shown in the drawings already described above, are hinged to one body side sill and shackled to the transversely opposite body side sill, with the downwardly extending ends of these cross levers hinged and shackled to a kingpin plate, comprising body side bearings. These side bearings transfer the load of the sprung mass directly to the top of the truck side frames, without vertical load at the kingpin. The very top of the truck side frame members, shown in the drawings, and described above, serve as truck side bearings. The pivotal trunnion or kingpin may be isolated from horizontal impacts by an elastomeric sleeve, surrounding the kingpin and comprising part of the kingpin assembly labelled such in the description above.

Again, where the suspension system, which comprises the present invention, is utilized as an integral body bolster, the inherent stability of the suspension system may be enhanced by decreasing the diameter, and increasing the length ratio of the bonded concentric hubs. The hinge to the car body side sill, at one end of the car, may be on the same side of the body as the shackle of the suspension at the opposite end of the car.

This is best seen in FIG. 7 of the drawings, described above.

I also emphasize here that the crossed lever suspension structures, disclosed in various embodiments in the drawings, and described in the specification, are equally applicable to railroad cars, supported by a single non-swivelling axle at each end of the car. The downwardly extending ends of the crossed levers, in such cases, amy be bifurcated to extend outwardly past the wheel flanges, over the axle, to a position where they are supported by a longitudinal extension of the axle journal box. This extension, in effect, is a truck side frame, where each lever is trunnioned. The upwardly extending ends of the crossed levers, in such cases, are hinged to the car body, without a center plate, kingpin, or side bearings.

The bonded elastomer, or elastomeric collar, which is stressed in torsional sheer, and which has been described in a number of the embodiments above, as interconnecting inner and outer hubs, may be 12 inches in diameter and 40 inches long, for a 60,000-pound capacity single axle, or may be 15 inches in diameter by 27 inches in length, without interference with any part of the car or braking gear. Supplemental load support springs, or elastomers, may be mounted above the axle journal boxes, and under the car body side sill, to enable a smaller capacity torsional shear spring in the crossed lever assembly, which otherwise provides parallelism of the car body, with respect to the axle, wheels and railhead, for the prevention of "hunting", with its attendant wear of tires and rails.

Studies anc calculations, peformed by me, indicate that a 100-ton suspension system, utilizing the crossed lever arrangements, which have been shown and described above, indicate that a preferred angle of approximately 20°, as between the crossed lever members, will provide arcuate transverse movement of 3/16 inch per hinge, with no shackles present in the suspension system. It may be feasible, with 1 inch to 1¼ inch wall thicknesses of urethane or rubber bushings in the hinges to accommcdate the 3/16 inch radial deflection. The torsional movement, in the levers, should not appreciably exceed 2°.

I wish to emphasize, most strenuously here, that this invention contemplates a choice, as between shackle and hinge assemblies. I also wish to emphasize that, where the angle between the crossed lever members is such that the arcuate movement of the respective ends at the hinge assemblies may be absorbed in radial deflections of the hinge bushings, that the shackles and shackle assemblies may be entirely dispensed with and replaced by hinge assemblies.

In conclusion, the embodiments of the invention, particularly disclosed and described hereinabove, are presented merely as examples of the invention. Other embodiments, forms and modifications of the invention, coming within the proper scope and spirit of the appended claims, will, of course, readily suggest themselves to those skilled in the art.

What is claimed is:

1. A vehicle suspension system for use in conjunction with a railroad car, or the like, comprising, in combination: a truck assembly having side frames disposed longitudinally with respect to a car body supported thereby, said car body being pivotally supported by the truck assembly, and resilient means cooperative with the truck assembly for preserving substantially uniform parallelism as between the car body and the riding surfaces upon which the truck assembly is carried, said resilient means comprising a crossed lever assembly interconnecting sprung and unsprung elements of said car whereby parallelism of these elements is operatively preserved throughout the load range of the suspension system, said crossed lever assembly comprising a hollow hub assembly integral with crossed levers, the hollow hub assembly including concentrically disposed component hubs located at a common intersecton of the crossed levers, radially adjacent surfaces of said hubs being bondedly interconnected by an elastomeric collar, said elastomeric collar being operationally stressed in torsional shear in resistance to load deflection of outwardly extending ends of said levers, the upwardly extending ends hingedly supporting said sprung elements, downwardly extending ends of said levers being supported by sid unsprung elements.

2. A vehicle suspension system according to claim 1, wherein said car body is pivotally supported over at least two load supporting axles.

3. A vehicle suspension system according to claim 1, wherein said car is supported by a single axle adjacent each end thereof, said crossed lever assembly being supported directly over transversely disposed journal boxes associated with each axle, said levers being bifurcated for extension toward a transverse center portion of the car beyond a car wheel.

* * * * *